United States Patent [19]
Christie

[11] Patent Number: 5,234,082
[45] Date of Patent: Aug. 10, 1993

[54] RAILROAD BRAKE SHOE

[75] Inventor: C. Dale Christie, Naperville, Ill.

[73] Assignee: Amsted Industries Incorporated, Chicago, Ill.

[21] Appl. No.: 724,733

[22] Filed: Jul. 2, 1991

[51] Int. Cl.⁵ .............................................. F16D 69/00
[52] U.S. Cl. .................................. 188/250 G; 188/29; 188/50 B; 188/252
[58] Field of Search ........... 188/250 R, 250 G, 250 B, 188/251 R, 251 A, 252, 254, 29, 33

[56] References Cited

U.S. PATENT DOCUMENTS

| | | | |
|---|---|---|---|
| 1,219,463 | 3/1917 | Kinzer | 188/251 R |
| 1,349,129 | 8/1920 | Gibson | 188/251 R |
| 1,823,879 | 9/1931 | Connolly | 188/251 R |
| 2,355,419 | 8/1944 | Bruce | 188/251 R |
| 3,751,330 | 8/1973 | Gilbert | 188/251 R |
| 4,244,994 | 1/1981 | Trainor et al. | 188/251 A |

OTHER PUBLICATIONS

"Modeling the Drag Braking of Freight Car Wheels Having Simulated Heat Treatment", A. J. Opinsky and M. W. Joerms.

"An Interpretive Review of Wheel Failure Performance W.R.T. Design and Heat-Treatment", D. H. Stone.

"North American Wheel Failure Experience" D. H. Stone et al.

"Safe Thermal Loads for 33-Inch Railroad Wheel" H. R. Wetenkamp et al.

Primary Examiner—George E. A. Halvosa
Assistant Examiner—Lee W. Young
Attorney, Agent, or Firm—Edward J. Brosius; F. S. Gregorczyk

[57] ABSTRACT

A tread brake shoe for a railroad wheel has a cross-section with a bidirectional laminate structure, which includes a core element of a high-friction material for contacting the wheel tread and, at least one low-friction element positioned on the high-friction material sidewall for contact with the wheel flange and to inhibit wheel flange contact with the high friction material.

18 Claims, 3 Drawing Sheets

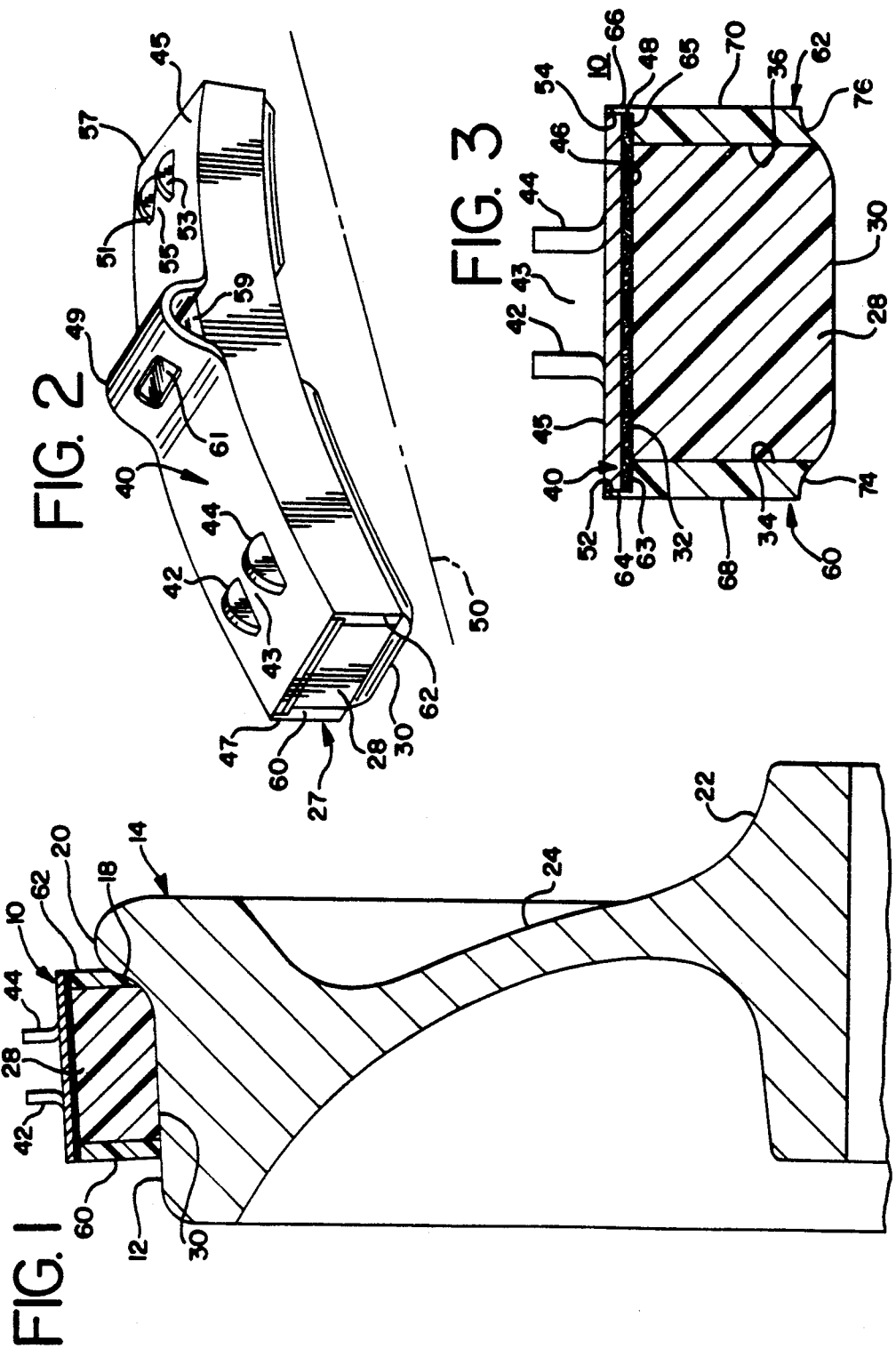

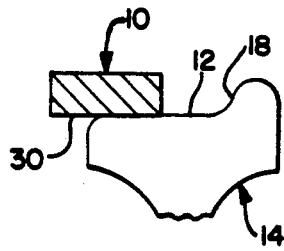 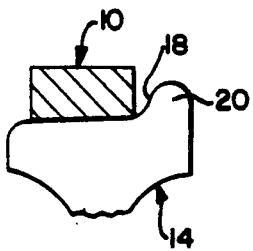 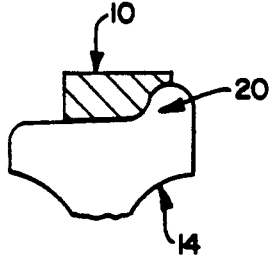
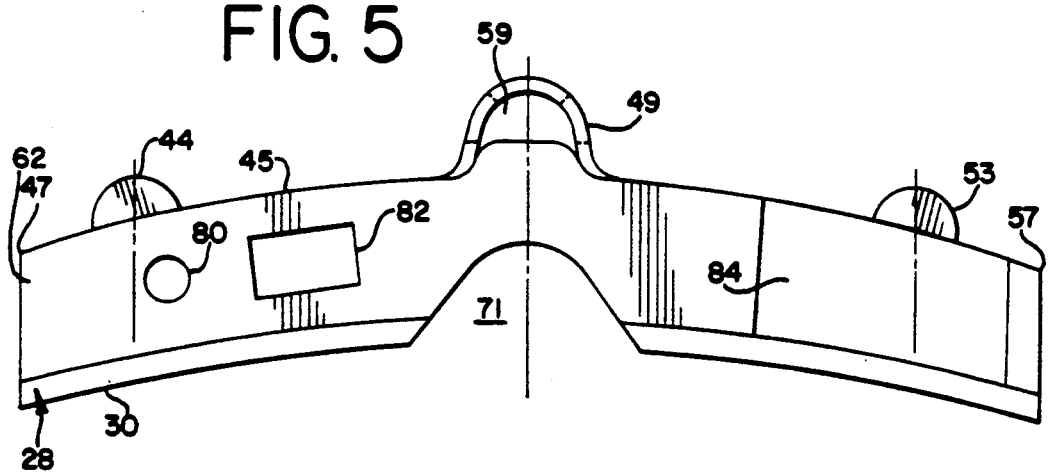
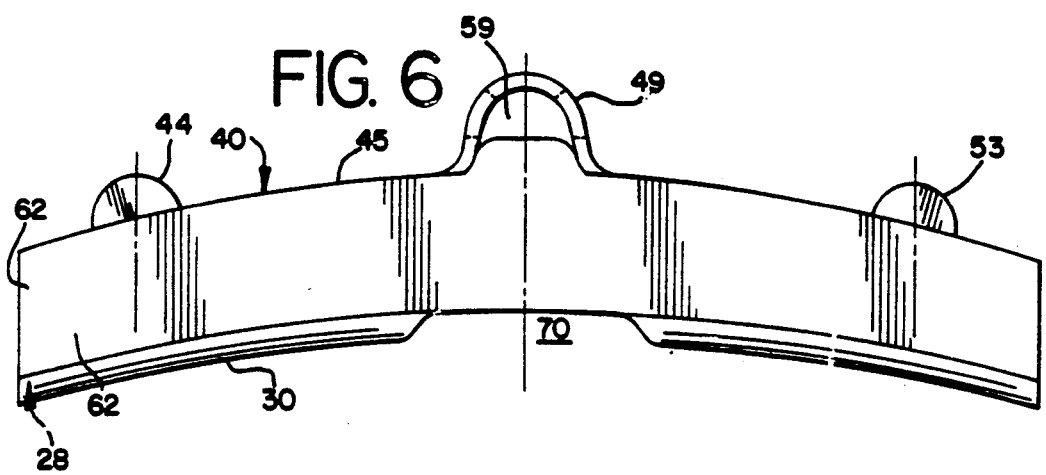

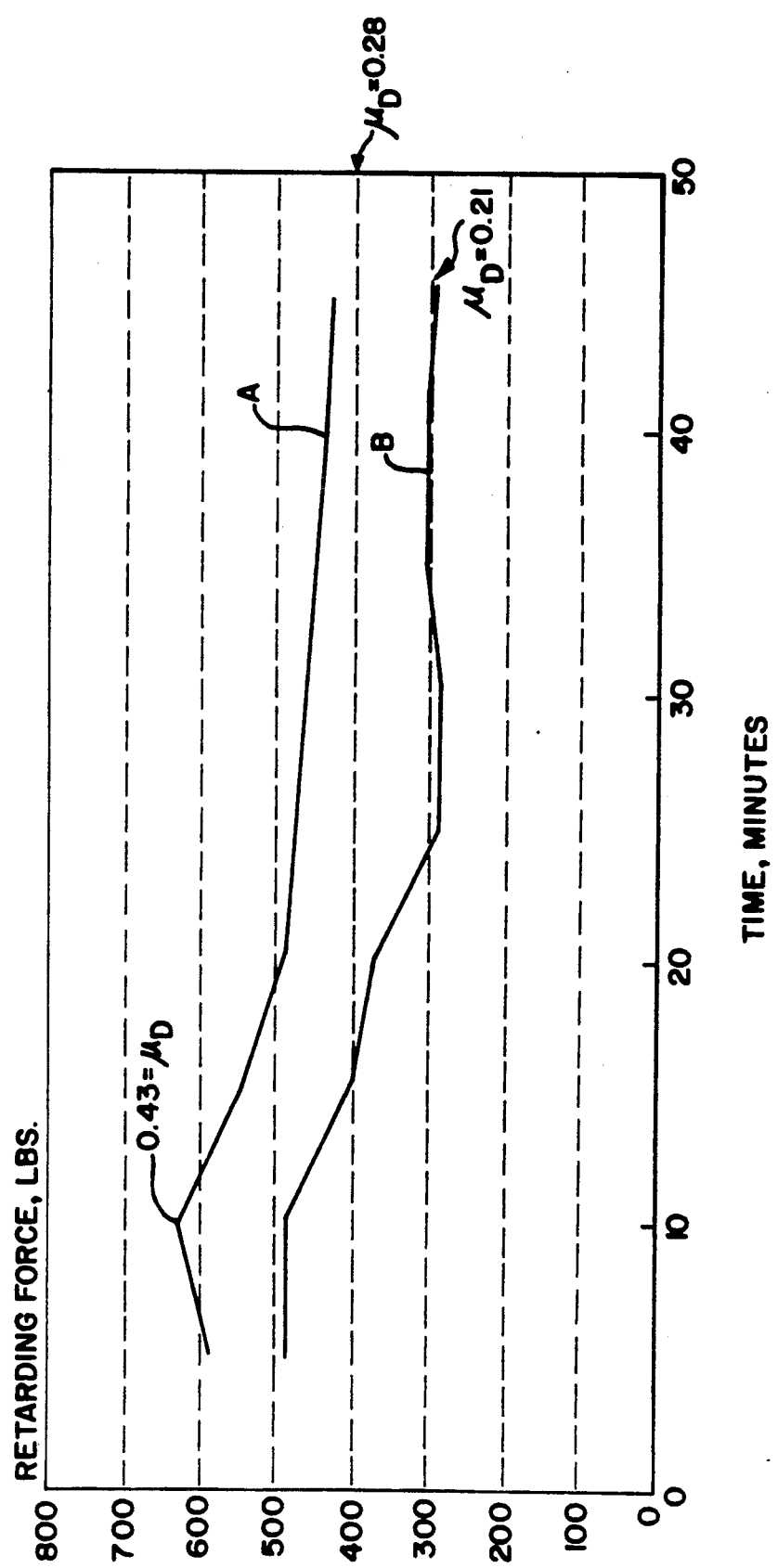

RAILROAD BRAKE SHOE

BACKGROUND OF THE INVENTION

The present invention relates to an improved brake shoe for use in a railway braking system. More particularly, a composition brake shoe is provided with a bidirectional laminated structure, which shoe is mountable on a metal backing plate affixable to a brake head or operator. The shoe has a high-friction composition material for wheel tread gripping, and a low-friction material for contact with the wheel flange to minimize the wear and heat buildup in the flange. Frictional contact between a high-friction-composition brake shoe element and the railroad wheel flange may create temperature gradients in the wheel flange which can induce residual tensile stresses. Lower thermal effects reduce the propensity for development of undesired residual tensile stresses in the wheel flange, which tensile stresses can lead to catastrophic wheel failure.

Brake shoes on railway vehicles, that is cars and locomotives, have been utilized since the inception of the railway industry. The brake shoe for a considerable period of time in history was a cast iron body having a substantial thickness and a curved braking surface generally corresponding to the curvature of a railway car wheel. The non-contacting or back-side of these cast iron brake shoes frequently included a supporting plate or strip formed from rolled steel around which the brake shoe body was cast. The supporting plate or strip reinforced the cast iron body and acted to maintain its structural integrity in the event of brake shoe fracture during service.

A second type of brake shoe currently in use on railway cars and locomotives has an organic-based composition body supported on a steel backing plate, which backing plate may be similar to the support member of the above-noted cast iron brake shoe. An exemplary railway brake shoe arrangement is illustrated in U.S. Pat. No. 4,466,513 to Dedek. In composition brake shoes, the key lugs, rejection lugs, and other elements of the brake shoe assembly on the mounting plate and brake head, are formed as part of the supporting backing-plate. The above-noted cast iron shoe structure may also have key lugs, toe guides and various other elements cast as part of the brake shoe body.

The composition type brake shoes generally have a substantially higher retarding force per unit of brake-applied force than the cast-iron brake shoes, as they have a higher coefficient of friction than is obtainable with a cast-iron brake shoe. The composition shoes are noted as high-friction, low-pressure devices, as they may be utilized at substantially lower operating pressures than the cast iron shoe, while cast iron shoes are frequently referred to as low-friction, high-pressure devices.

High friction brake shoe compositions at normal operating conditions are or may usually be characterized by a dynamic coefficient of friction between about 0.25 to 0.50, however, under known specific circumstances the coefficient of friction may be outside this range. Similarly, low friction brake shoes may broadly be considered to have dynamic coefficients of friction between about 0.15 to 0.30. These ranges for the coefficients overlap at their respective lower and upper bounds. However, the differential between the material coefficients illustrates the difference in the materials and distinguishes their applicability to a particular function.

A particular difficulty associated with the composition brake shoes had been their tendency to break or fracture under severe operating conditions and to separate from the metal backing plate even under mild braking conditions. These disadvantages may have been attributable to the difference in thermal coefficients of expansion of the composition body and the metal back structure, which may have resulted in the brake shoe body being stressed beyond the fracture point or inducing separation from the metal backing plate from flexural forces on the brake shoe. The relatively severe vibrational forces encountered in railway service and the shock loading on the brake shoe upon initial application of the brakes to the wheel may also act to detach the composition body from the metal back and/or to fracture the composition brake shoe body.

Illustrative brake shoe body compositions are taught in U.S. Pat. No. 3,168,487—Spokes, et al, and U.S. Pat. No. 3,227,249—Kuzmick, which latter patent teaches a composition brake shoe with an organic bond matrix, a hard mineral filler and a cryolite addition to reduce the wear of the contacted wheel. Inorganic fillers are also added to shoe compositions to stiffen or reinforce the organic bond.

U.S. Pat. No. 4,219,452—Littlefield discloses the preparation and manufacture of a high friction composition railroad brake shoe, which composition is devoid of asbestos and is operable to withstand braking parameters associated with the deceleration of railroad locomotives. This composite element has a rubber and/or resin binder with a plurality of fillers, at least one of which has an oil absorption value of at least 30, and a fiber formed from an aramid polymer. More specifically, the asbestos free composite friction element incorporates a curable rubber binder; hard mineral fillers; friction modifiers; reinforcing aramid fibers; and the above-noted absorptive fillers. The asbestos-free composite friction shoe is capable of withstanding high temperatures, has high physical strength, and is operable to provide braking characteristics to meet the test standards of the Association of American Railroads (AAR) for brake shoes made with a blend of organics and/or inorganic materials. This standard is noted at Specification M-926 in the Manual of Standards and Recommended Practices from the Association of American Railroads-Mechanical Division. Each of the above-noted composite materials is referred to as a high-friction component, which are elements tolerant of high temperatures and require only low pressure to apply their braking and gripping force to railroad wheels.

At braking of a moving rail car, the change in potential and kinetic energy is converted to heat at the brake shoe-railroad wheel interface. It is desirable to provide the wheel shoe interface at the wheel tread surface and not the flange, as contact between the high friction composition brake shoes and the flange can lead to excessive heating of the flange from the frictional engagement between the flange and the high-friction brake shoe.

Railroad car brake shoes during braking engagement with the wheel are susceptible to displacement from their position relative to the wheel tread. The brake shoe may migrate laterally and engage the wheel tread with less than all of its facing or braking surface, and further may engage the flange of the wheel. These migrating conditions are usually parallel to the wheel and axle axis, which produces an overhanging condition, that is brake shoe migration off the wheel tread, or an overriding condition where the brake shoe edge contacts and wears on the wheel flange. As the brake shoes on an axle are frequently coupled by a connecting beam, lateral migration by one of the shoes to an overriding or overhanging condition induces the alternate condition in the opposite brake shoe. In the overriding shoe position, the rubbing contact of the brake shoe with a wheel flange can produce residual tensile stresses in the flange area, which may lead to the propagation of cracks, catastrophic wheel failure and subsequent broken-wheel derailments. Discussions, analysis and evaluation of the effects of residual stresses, cracks, fatigue and other variables on railroad wheel failures and fractures are provided in the following articles:

1.) "Modeling the Drag Braking of Freight Car Wheels Having A Simulated Heat Treatment" by A.J. Opinsky and M.W. Joerms;

2.) "An Interpretive Review of Wheel Failure Performance With Respect to Design and Heat-Treatment" by D.H. Stone;

3.) "North American Wheel Failure Experience" by D.H. Stone, W.S. Pellini and W.J. Harris, Jr.; and 4.) "Safe Thermal Loads for a 33-inch Railroad Wheel" by H.R. Wetenkamp and R.M. Kipp.

Although it is desirable to provide a brake apparatus, which is perfectly stable and consistently alignable with the tread of the railroad wheel, the record of railroad wheel accidents and derailments illustrates that this desire has not yet been attained. Thus, there are continuing efforts to produce new brake apparatus and to reduce the effects, if not the fact, of contact between the railway brake shoe and the railway-wheel flange. Resolution of the wheel flange-brake shoe contact problem requires balancing the need to provide adequate braking forces on the wheels by providing maximum surface contact between the brake-shoe-tread-contacting-surface and the wheel tread while minimizing or eliminating contact between the brake shoe and the flange. In an ideal situation, the brake head mechanism would maintain the brake shoe body in alignment with the wheel tread face. As new developments continue on the brake head alignment problem, other research developments are being directed to minimizing the effects of brake shoe migration, brake shoe fracture, tread wear, flange engagement, flange wear, and catastrophic wheel failure.

The brake shoe of the present invention does not detract from the gripping or tread-contacting surface of the high friction shoe element, but inhibits and minimizes the effect of contact between the brake shoe assembly and the wheel flange. Thus, the incidence or occurrence of excessively high temperatures in the flange from frictional contact between the brake shoe high friction material and the wheel flange is minimized, which results in lower thermal stresses in the wheel flange. Concomitantly, the incidence of residual tensile stresses in the flange area from intimate contact between this high friction brake shoe material and the wheel flange, and the consequent fatigue cracking, stress fractures and potential derailments resulting therefrom, are also expected to be reduced.

SUMMARY OF THE INVENTION

The present invention provides a railroad wheel brake shoe having a composition body with a bidirectional laminate structure, which shoe is mountable on a brake head and engageable with the wheel tread. The composite structure is secured generally along its longitudinal axis to a metal backing plate with a radius of curvature similar to the wheel tread, which brake shoe conforms to the metal backing radius of curvature for smooth contact with the wheel tread. A bonding material, which is positioned between the metal backing plate and the high-friction material of the shoe body, cooperates with the high-friction material components to provide a laminate or layered structure in the vertical cross-section of the brake shoe. A low-friction material, which is bonded or secured to at least one of the lateral or side wall edges of the high-friction composition material, cooperates with the high-friction material to provide a second laminate structure in a transverse or horizontal cross-sectional direction. Generally, a low-friction composite material is bonded to both side wall edges of the high friction material to allow mounting the brake shoe body in either direction while providing a low-friction composite material in proximity to the wheel flange to avoid wheel flange contact with the high-friction material. The relatively low-friction material on the brake-shoe side wall edge is engageable with the flange at lateral migration of the brake shoe from the tread surface. This low-friction material inhibits contact or coupling of the wheel flange with the high-friction material, thus reducing temperatures in the flange and the consequent thermal stresses in this segment of the railroad wheel. The reduction of thermal stresses minimizes the potential for residual tensile stresses in the wheel, which can lead to catastrophic wheel failures and associated broken wheel derailments on rail cars.

BRIEF DESCRIPTION OF THE DRAWING

In the figures of the Drawing, like reference numerals identify like components and in the drawing;

FIG. 1 is a cross-sectional view of a rail wheel with a brake shoe contacting the tread and flange in an overriding condition;

FIG. 2 is a perspective view of a brake shoe of the present invention;

FIG. 3 is an elevational view in cross-section of the brake shoe in FIG. 2;

FIG. 4a illustrates in a cross-sectional elevational view a single element brake shoe in an overhanging position on a railroad wheel;

FIG. 4b illustrates in a cross-sectional elevational view a single element brake shoe in an overriding position in contact with a rail wheel flange;

FIG. 4c illustrates in a cross-sectional elevational view a single element brake shoe centered on a rail wheel tread;

FIG. 5 is a side elevational view of a currently produced brake shoe with a large stress relief cutout arrangement for mounting on a brake head;

FIG. 6 is a side elevational view of a proposed brake shoe assembly with a shallower stress relief cutout for a brake head utilizing the present invention; and, FIG. 7 is graphical illustration of an output curve for retardation force as a function of time for specific materials at a determined applied load.

DETAILED DESCRIPTION OF THE PREFERRED EMBODIMENT

In wheel mounted railway cars, energy changes are transferred through the wheels, and brake shoes are utilized to halt the vehicle by grasping or engaging a wheel, drum or disc. A wide variety of brake shoes are manufactured for application on disc brakes and drum brakes for automobiles as well as railway car tread brakes and tread-flange brakes. The brake shoes for railway cars and locomotives may be an organic composition or cast-iron brake shoe. In FIG. 1, a railway car, tread-engaging brake shoe assembly 10 has shoe contact surface 30 in contact with tread 12 of railroad wheel 14 and brake shoe side wall 62 is contacting inner surface 18 of wheel flange 20. This brake shoe-wheel flange contact is termed an overriding condition for brake shoe 10, as shown in FIG. 4b at an extreme condition for demonstration purposes only and not as a limiting condition. Alternative operating positions for brake shoes 10 are the overhanging position of FIG. 4a, which has less than all of the brake-shoe contact surface 30 engaging tread 12; and the centered position of FIG. 4c, which is the desired position for a tread-engaging brake shoe of a railroad car. The centered position provides maximum contact between wheel tread 12 and the brake shoe surface 30 without contacting wheel flange 20.

Wheel 14 in FIG. 1 has hub or axial region 22 coupled to wheel tread 12 and flange 20 by web 24. Wheel 14 is rotatably mountable on an axle (not shown) and in normal operation it would be gripped or grasped by brake assembly 10 to bring the railway car to a braked condition.

Brake assembly 10 is shown in perspective in FIG. 2 and in an enlarged cross-sectional view in FIG. 3 with composition brake shoe 27. Brake shoe 27 has central portion or core element 28 with upper surface 32 secured to backing plate 40 at backing plate lower surface 46, which core 28 is a high-friction material such as taught in U.S. Pat. Nos. 4,169 680; 4,219,452; 4,313,869; 4,466,513; and, U.S. patent application Ser. No. 07/690,286. The precise composition of this high-friction material is not determinative of nor limiting to the present invention. The high-friction composition element 28 is operable to contact and grip wheel tread 12 at shoe surface 30, and, as noted above, the high-friction material grips with minimal applied load but it has a relatively large friction force at the interface of surface 30 with tread 12. In the illustrated embodiments, backing plate 40 and central portion 28 are formed with a radius of curvature to conformingly contact the circumference of wheel 14 at tread 12. Core element first sidewall 34 and second side wall 36 are shown as flat parallel surfaces for illustrative purposes but the shape of these surfaces is a design choice.

Backing plate 40 provides longitudinal support and stability to the composition material core 28. Backing plate 40 in FIG. 2, which may be metal, has a first set of rejection lugs 42 and 44 with gap 43 at its first end 47 and a second set of lugs 51 and 53 with gap 55 at second end 57. Lugs 42, 44, 51 and 53 vertically extend from upper surface 45 for locating the brake 10 or engagement with a brake head (not shown). Key lug 49 is generally centered along backing plate 40 in the longitudinal direction exemplified by longitudinal axis 50 and it includes passage 59, which is transverse to axis 50, and longitudinal passage 61 for receipt of a mounting or securing key to anchor brake assembly 10 to a braking mechanism (not shown).

Adhesive or bonding layer 48 is positioned on mounting plate lower surface 46 which adhesives are known in the art for securing core element 28 to backing plate 40, as shown in FIG. 3. High friction component of core 28 is laterally centered on adhesive or bonding layer 48 and metal backing plate 40 in FIG. 3, and is aligned along longitudinal axis 50 of brake shoe 10. Core 28 does not extend to lateral edges 52 and 54 of metal backing plate 40 or adhesive layer 48.

First and second low-friction material wear or rubbing strips 60, 62 with respective outer sidewalls 68, 70 in FIG. 3 are mounted, respectively, on lateral edges 34 and 36 of core material 28 to prevent contact of high friction material 28 with flange 20 at an overriding position. In the illustrated figures, strips 60, 62 provide full-length side walls to assembly 10 along longitudinal axis 50. However, low-friction material segments may be provided in lieu of a continuous sidewall surface, as shown in FIG. 5 with knobs 80, blocks 82 or short strips 84. In FIG. 3, strips 60, 62 downwardly extend from metal backing upper surface 45 and are secured or bonded to the exposed edge of adhesive strip 48 at shoulders 63, 65 respectively. Shoulders 63, 65 are formed by the extension of small segments 64, 66 from respective wear strips 60 and 62 at sidewalls 68, 70, which provide a continuous lateral surface along the outside edge of assembly 10. Alternatively, metal backing plate edges 52 and 54 and adhesive strip 48 may extend outwardly to be aligned with outer surfaces 68 and 70 of low-friction material elements 60, 62. At or in proximity to contact surface 30, each of wear strips 60, 62 has a contoured or tapered edge 74, 76, respectively, for contoured contact with flange 20 of wheel 14. As noted above, other configurations of low-friction material may be mounted on lateral edges 34, 36 to buffer or inhibit contact between high-friction material 28 and flange wall 18.

In an exemplary illustration of drag test conditions required under the AAR specification M-926 and as shown in FIG. 7, the composition material of low-friction strips 60, 62 may have a dynamic coefficient of friction of approximately 0.15 to 0.30. The coefficient of friction of the high-friction core material 28 may have, or preferably has, a dynamic coefficient of friction of about 0.25 to 0.50, although it may be greater than 0.50. This differential between the high and low-friction material coefficients provides a ratio of the friction coefficients of about 3:2, which still provides adequate wearing materials with the requisite braking potential to meet industry standards.

A composition low-friction material was utilized for dynamic testing, which material had approximately the following analysis:

|  | Weight % |
|---|---|
| Bonding Materials: | |
| Polymerized Liquid Cashew Resin | 9.60 |
| Reactive Diluent: | |
| Raw Cashew Nut Oil | 2.40 |
| Styrene-Butadiene Rubber | 12.00 |
| Hexamethylene Tetramine | 0.69 |
| Sulfur/Accelerating Agents | 0.40 |
| Zinc Oxide | 0.66 |
| Carbon-Based Fillers | |
| Petroleum Coke | 32.00 |
| Inorganic Fillers: | |
| Clay | 38.00 |
| Reinforcing Fibers: | |
| Chopped Fiberglass | 2.60 |
| Acryllic Fiber | 0.45 |
| Extender: | |
| Plasthall 100 (from C. P. Hall Co.) | 1.20 |

| -continued | |
| --- | --- |
| | Weight % |
| | 100.00 |

Other low-friction materials are available and may be substituted to provide the necessary dynamic coefficient of friction.

In FIG. 7, the minimal acceptable braking or retardation force for a brake shoe at an applied load of 1,450 pounds is 400 pounds as established by the AAR in the above-noted M-926 specification for high-friction composition type brake shoes. The dynamic coefficients of friction are illustrated for both a high-friction material (upper curve, A) and a low-friction material (lower, dashed-line curve B). In these curves, retardation force in pounds (vertical axis) is plotted as a function of time in minutes (horizontal axis), and after an initial increase in the force at initial brake engagement, the force curve downward)y tapers from a peak to approximately parallel the AAR minimum acceptable force. This tapering is approximately the effect of brake fade, although the force curve is still above the minimum required force. The force curve for the low-frictional material is shaped similarly to the high-friction material curve but traces its shape between one-half the AAR minimal force (or 200 pounds) and the curve for the high-friction material. The differential or separation between curves A and B illustrates a difference between the high- and low-friction materials. The above-noted dynamic coefficients of friction, which are defined by dividing the retarding force (in pounds) by the brake shoe load at any point along the curves, are measured or noted at the peaks in the curves.

A rubbing or wearing brake shoe component 28 on a tread 12 and flange 20 wears the tread or flange surfaces and the brake shoes, and also generates heat between the rubbing surfaces. Tread contacting brake shoe assemblies 10 are designed to contact the tread portion 12 of a railroad wheel 14 to engage, grip and brake the railcar. However, in practice, the position of brake assembly 10 shoe and the severe conditions of its working environment may, in fact, cause brake shoe 10 to laterally drift either off tread surface 12 or into contact with flange 20 of a railroad wheel as noted in FIGS. 4a and 4b. Although brake shoe assembly 10 in the several figures is shown as a separate entity, which is the usual arrangement for most railroad locomotives, brake shoes 10 on a wheel truck for a railway freight car are usually coupled by a cross beam. As a consequence lateral drift on shoe in one direction imposes or implies lateral drift in an opposite direction for the coupled brake shoe. The reference to lateral movement refers to the positions noted in FIGS. 4a-4c, although tread contacting brake shoes 10 are not generally intended to mate or couple with flange surfaces 18. Actual brake shoe assembly contact, wear and heating of flange 20 can result in residual tensile stresses inducing subsequent fatigue, fracture, catastrophic failure of a flange and wheel, and potentially a derailment. As a consequence, the rail industry generally, as well as wheel and brake shoe suppliers, is continuously striving to provide equipment to avoid catastrophic failure.

The present invention provides a dual-component brake shoe with a low-friction element and a high-friction material element 28 to contact tread surface 12 to grip and secure railroad wheel 14 during a braking condition, which wheels 14 are usually cast iron or steel. The lower friction material of lateral elements 60, 62 is not as abrasive or aggressive as the high friction material upon contact with flange 20 of wheel 14. This less aggressive and lower dynamic coefficient-of-friction material reduces the frictional resistance between flange 20 and brake shoe assembly 10, which will reduce the temperature increase and the resultant residual tensile stresses in flange 20. The combination of the high-friction material and low-friction material structure meets or exceeds the AAR requirements in the above-noted Specification M-926 for high-friction composition material brake shoes. Specifically, the brake shoe of the present invention meets the grade-tests, both stop-tests, and the static friction test. In the preferred embodiment, brake shoe assembly 10 has low-friction material rub or wear strips 60, 62 along both lateral edges of the assembly. It is readily apparent that only one edge of the brake shoe core 28, in fact, must have a wear strip, but to prevent inadvertent, misplaced or misdirected arrangement of brake shoe assembly 10 during mounting and assembly on rail wheel 14, a wear strip of low friction material can be applied to both lateral edges 34, 36 of assembly 10. The impact of the overriding condition on core element 28 is illustrated in FIG. 1 where one of wear strips 60, 62 has engaged flange 20 at flange surface 18 and is slightly deformed or worn, however, core 28 is still maintained in intimate contact with tread surface 12.

In FIG. 6, a center stress-relief portion 70 has been relieved from the overall length of brake shoe assembly 10 at lower surface 30. Assembly 10 can also accommodate the larger relief portion 71 of the currently manufactured structure illustrated in FIG. 5. In FIG. 6, core 28 has the same overall length along the curvature of shoe assembly 10 as the current structure in FIG. 5. However, the low-friction composition material wear strips 60, 62, as shown in FIG. 2, extend along axis 50 the full length of core lateral edges or sides 34, 36, which provides full low-friction material coverage along the entire length of the brake shoe 10 to inhibit contact between high-friction material core 28 and flange face 18. Brake assembly 10 may be as wide as desired to accommodate changes in the transverse dimension of any core 28, wear strips 60, 62 or metal backing plate 40.

Those skilled in the art will recognize that certain variations can be made and illustrated in embodiments. While only specific embodiments of the invention have been described and shown, it is apparent that various alterations and modifications can be made therein. It is, therefore, the intention in the appended claims to cover all such modifications and alterations as may fall within the true scope and spirit of the invention.

What is claimed is:

1. A tread brake shoe for a railroad car wheel having a wheel tread and a wheel flange, which brake shoe is mountable on a brake head and, at a reference position, is engageable with said wheel tread to brake and retard a railroad car, said brake shoe comprising:
 a metal backing with a generally longitudinal axis, a radius of curvature, an upper surface and a lower surface;
 a show body having a one-piece core generally extending the length of said metal backing, said shoe body having a cross-section approximately transverse to said longitudinal axis and,
 at least one lateral member;

said core being a first composition material with a first dynamic coefficient of friction, said core having a tread-engaging surface, a bonding surface, a first lateral sidewall and a second lateral sidewall, which first and second lateral sidewalls are generally parallel to each other and said longitudinal axis, and approximately normal to said metal-backing lower surface;

said at least one lateral member of a second composition material with a second dynamic coefficient of friction less than said first dynamic coefficient of friction, said at least one lateral member secured on one of said core first and second lateral sidewalls, said core and at least one lateral member cooperating to define a first laminate arrangement in a first cross-sectional core direction;

means for bonding secured to said metal-backing lower surface, said core secured to said means for bonding at said core bonding-surface, said means for bonding cooperating with said core to define a second laminate arrangement in a second core cross-sectional direction approximately normal to said core first cross-sectional direction, said first composition material operable to contact and grip said railroad car wheel tread to brake and retard said railroad car, and said lateral member of said second composition material operable to engage said wheel flange and inhibit flange contact with said first composition material to reduce flange temperature increases at engagement of said brake shoe body with said flange at lateral displacement of said brake-shoe body from said reference position in alignment with said wheel tread to said flange engagement at a brake-shoe overriding position.

2. A tread brake shoe for a railroad wheel as claimed in claim 1 wherein said first composition material is a high friction material.

3. A tread brake shoe for a railroad wheel as claimed in claim 2 wherein said high friction material has a dynamic coefficient of friction of at least 0.27.

4. A tread brake shoe for a railroad wheel as claimed in claim 1 wherein said second composition material is a low friction material.

5. A tread, brake shoe for a railroad wheel as claimed in claim 4 wherein said low friction material has a dynamic coefficient of friction between about 0.15 to 0.30.

6. A tread brake shoe for a railroad wheel as claimed in claim 4 wherein said low friction material has an average dynamic coefficient of friction of about 0.20 for a railcar at a speed of twenty miles per hour, at an applied braking load of 1,450 pounds over a 45-minute time span.

7. A tread brake shoe for a railroad wheel as claimed in claim 1, further comprising a second lateral member secured to the other of said first and second lateral sides.

8. A tread brake shoe for a railroad wheel as claimed in claim 1 wherein said first and second dynamic coefficients of friction at the same operating conditions have approximately a 2:1 ratio.

9. A tread brake shoe for a railroad wheel as claimed in claim 1 wherein said low-friction material has a dynamic coefficient of friction at least twenty percent lower than the dynamic coefficient of friction of sad high-friction material at the same operating conditions.

10. A tread brake shoe for a railroad wheel as claimed in claim 1 wherein said lateral member has at least one strip of said second composition material positioned on at least one of said first and second core sides, said at least one strip extending at least partially along said one side.

11. A tread brake shoe for a railroad wheel as claimed in claim 1, wherein said lateral member is a plurality of strips of said second composition material, each of said strips discretely secured to said core one side.

12. A tread brake shoe for a railroad wheel as claimed in claim 1 wherein said lateral member is at least one knob of said second composition material positioned on said core side, which knob is operable to contact said wheel flange at an overriding position to buffer said brake shoe body; and first composition material from said flange.

13. A tread brake shoe for a railroad wheel as claimed in claim 1 wherein said second composition material is softer than said first composition material.

14. A tread brake shoe for a railroad wheel as claimed in claim 1 wherein said at least one lateral member is at least one strip of said second composition material positioned and secured on said core and extending at least partially along said one side.

15. A tread brake shoe for a railroad wheel as claimed in claim 1 wherein said at least one lateral member is a plurality of discrete strips of said second composition material secured to said core sidewall.

16. A tread brake shoe for a railroad wheel as claimed in claim 1 wherein said at least one lateral member is at least one knob of said second composition material positioned and secured on said core sidewall.

17. A tread brake shoe for a railroad wheel as claimed in claim 1 wherein said core has a generally centrally located relief portion extending into said core from said lower surface.

18. A tread brake shoe for a railroad wheel as claimed in claim 1 wherein said at least one lateral member is secured to said at least one lateral sidewall and generally extends the length of said core sidewall.

* * * * *

UNITED STATES PATENT AND TRADEMARK OFFICE
CERTIFICATE OF CORRECTION

PATENT NO.   : 5,234,082
DATED        : August 10, 1993
INVENTOR(S)  : C. Dale Christie It is certified that error appears in the above-indentified patent and that said Letters Patent is hereby corrected as shown below:

Column 8, line 64, "show" should read --shoe--.

Column 10, line 13, "sad" should read --said--.

Signed and Sealed this

Thirty-first Day of May, 1994

Attest:

BRUCE LEHMAN

*Attesting Officer*    *Commissioner of Patents and Trademarks*